(12) United States Patent
Sarta et al.

(10) Patent No.: US 8,764,874 B2
(45) Date of Patent: Jul. 1, 2014

(54) ARRANGEMENT, METHOD, INTEGRATED CIRCUIT AND DEVICE FOR ROUTING REQUESTS

(75) Inventors: Davide Sarta, Portishead (GB); David Smith, Bristol (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 0 days.

(21) Appl. No.: 13/608,945

(22) Filed: Sep. 10, 2012

(65) Prior Publication Data

US 2013/0097343 A1    Apr. 18, 2013

(30) Foreign Application Priority Data

Oct. 14, 2011    (GB) .................................. 1117766.4

(51) Int. Cl.
*G06F 13/20* (2006.01)

(52) U.S. Cl.
USPC ................................................ 71/51; 710/38

(58) Field of Classification Search
None
See application file for complete search history.

(56) References Cited

U.S. PATENT DOCUMENTS

| | | | | |
|---|---|---|---|---|
| 4,623,996 A | * | 11/1986 | McMillen | 370/418 |
| 5,499,192 A | * | 3/1996 | Knapp et al. | 716/102 |
| 5,550,815 A | * | 8/1996 | Cloonan et al. | 370/396 |
| 5,570,348 A | * | 10/1996 | Holden | 370/236 |
| 6,191,612 B1 | * | 2/2001 | Agrawal et al. | 326/39 |
| 6,590,644 B1 | * | 7/2003 | Coin et al. | 356/218 |
| 6,686,856 B1 | * | 2/2004 | Wang et al. | 341/100 |
| 7,302,511 B2 | * | 11/2007 | Jeyasingh et al. | 710/260 |
| 7,526,679 B2 | * | 4/2009 | So et al. | 714/31 |
| 7,953,074 B2 | * | 5/2011 | Pettey et al. | 370/362 |
| 8,487,655 B1 | * | 7/2013 | Kutz et al. | 326/86 |
| 2002/0031110 A1 | * | 3/2002 | Li | 370/351 |
| 2005/0275427 A1 | * | 12/2005 | Wang et al. | 326/41 |
| 2008/0155155 A1 | * | 6/2008 | Christensen et al. | 710/301 |
| 2009/0206876 A1 | * | 8/2009 | Liu | 326/39 |

* cited by examiner

*Primary Examiner* — Cheng-Yuan Tseng
(74) *Attorney, Agent, or Firm* — Munck Wilson Mandala, LLP

(57) ABSTRACT

A request routing circuit includes m inputs for receiving m input request signals and n outputs for outputting a set of n output request signals. A routing subsystem within the request routing circuit is provided between the m inputs and the n outputs and comprises k inputs and n outputs, where m is greater than k, and where the routing subsystem is configured to operate over a plurality (m/k, rounded up to the next integer) of cycles to provide the set of n output request signals based on the m inputs to the n outputs.

20 Claims, 3 Drawing Sheets

ARRANGEMENT, METHOD, INTEGRATED CIRCUIT AND DEVICE FOR ROUTING REQUESTS

CROSS-REFERENCE TO RELATED APPLICATIONS

The present application claims priority to Great Britain Patent Application No. 1117766.4, filed Oct. 14, 2011, entitled "AN ARRANGEMENT AND METHOD FOR ROUTING REQUESTS."

TECHNICAL FIELD

The present disclosure relates to an arrangement, method, integrated circuit, and device for routing requests.

BACKGROUND OF THE DISCLOSURE

Interrupt Requests (IRQ) are used as a way for a device or block to request time from a processor to do a task associated with the device or block. However as systems have become more complex, more and more interrupt requests need to be managed. This may take increasing amounts of an area of an integrated circuit, which may be undesirable.

SUMMARY OF THE DISCLOSURE

According to one embodiment, there is provided a request arrangement comprising m inputs for receiving m input request signals. The request arrangement comprises n outputs for outputting a set of n output request signals. The request arrangement comprises a routing arrangement comprising k inputs and n outputs, provided between said m inputs and said n outputs, where m is greater than k, wherein the arrangement is configured to perform a plurality of cycles to provide said set of n output request signals.

According to another embodiment, there is provided a method comprising receiving m input request signals. The method comprises performing a plurality of cycles to provide a set of n output request signals, each cycle comprising routing k of said m input request signals, where m is greater than k. The method comprises outputting at the end of said plurality of cycles said set of n output request signals.

According to another embodiment, there is provided an integrated circuit comprising an arrangement for routing requests. The arrangement comprises m inputs for receiving m input request signals. The arrangement comprises n outputs for outputting a set of n output request signals. The arrangement comprises a routing arrangement comprising k inputs and n outputs, provided between said m inputs and said n outputs, where m is greater than k. The arrangement is configured to perform a plurality of cycles to provide said set of n output request signals.

According to another embodiment, there is provided a device comprising an arrangement for routing requests. The arrangement comprises m inputs for receiving m input request signals. The arrangement comprises n outputs for outputting a set of n output request signals. The arrangement comprises a routing arrangement comprising k inputs and n outputs, provided between said m inputs and said n outputs, where m is greater than k. The arrangement is configured to perform a plurality of cycles to provide said set of n output request signals. The device comprises one of a set top box, mobile set top boxes, mobile phones, smart phones, personal data organisers, video devices, and audio devices.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a better understanding of some embodiments, reference will be made by way of example only to the accompanying drawings in which.

DETAILED DESCRIPTION

Figure 1:
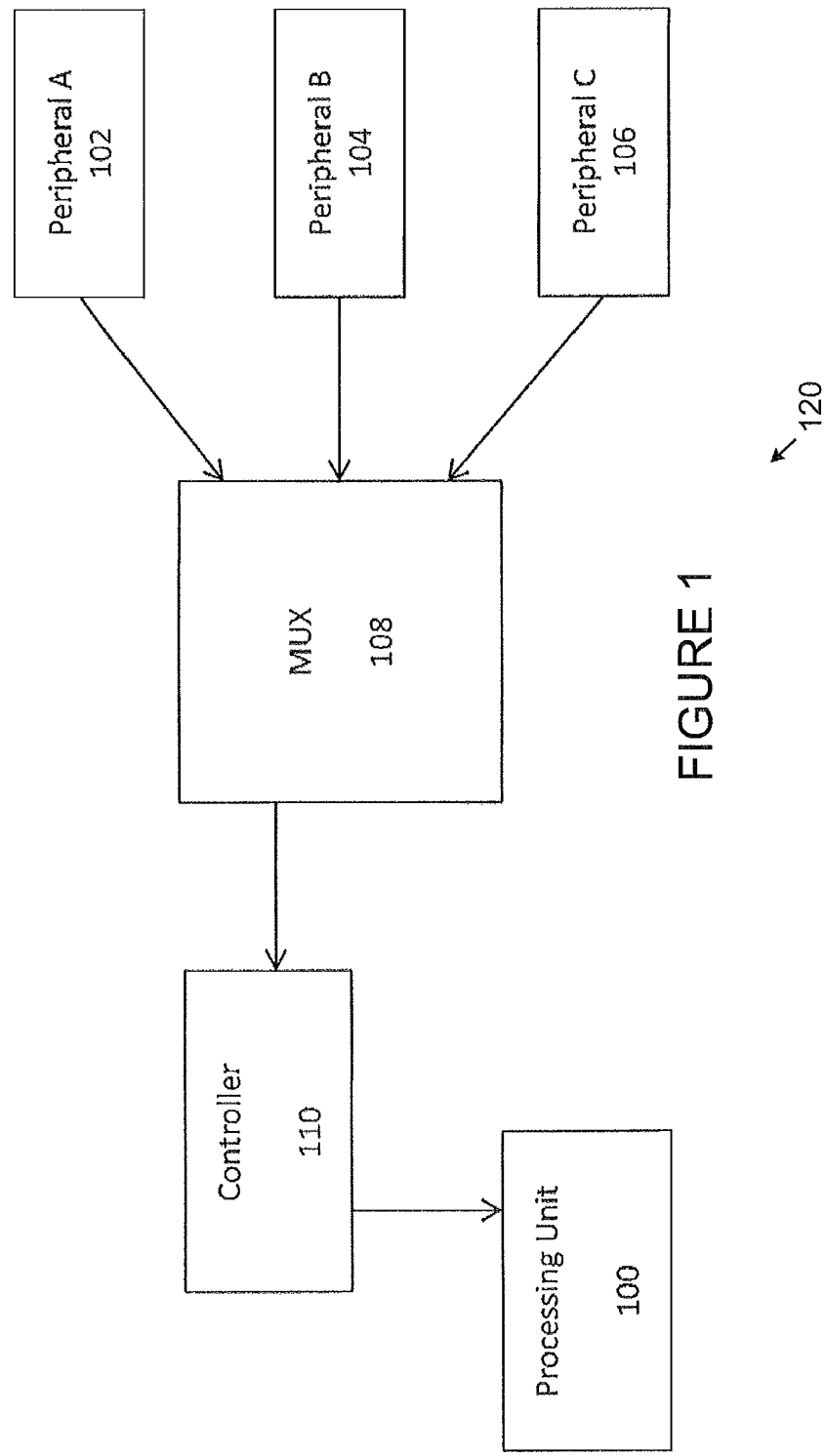
FIG. 1 diagrammatically illustrates an environment within which requests may be routed in accordance with various embodiments of the present disclosure.
Figure 2:
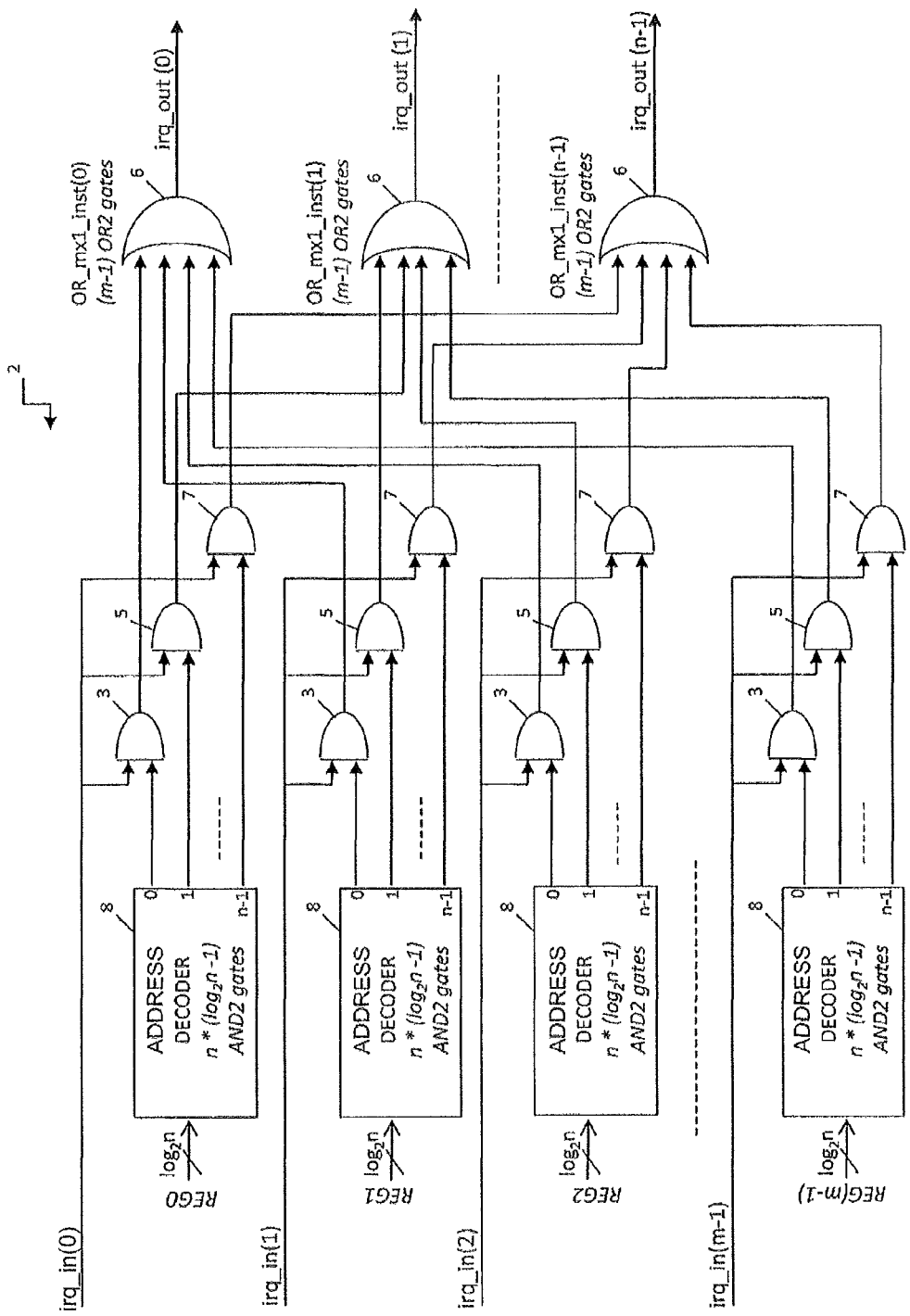
FIG. 2 schematically depicts a request routing circuit.
Figure 3:
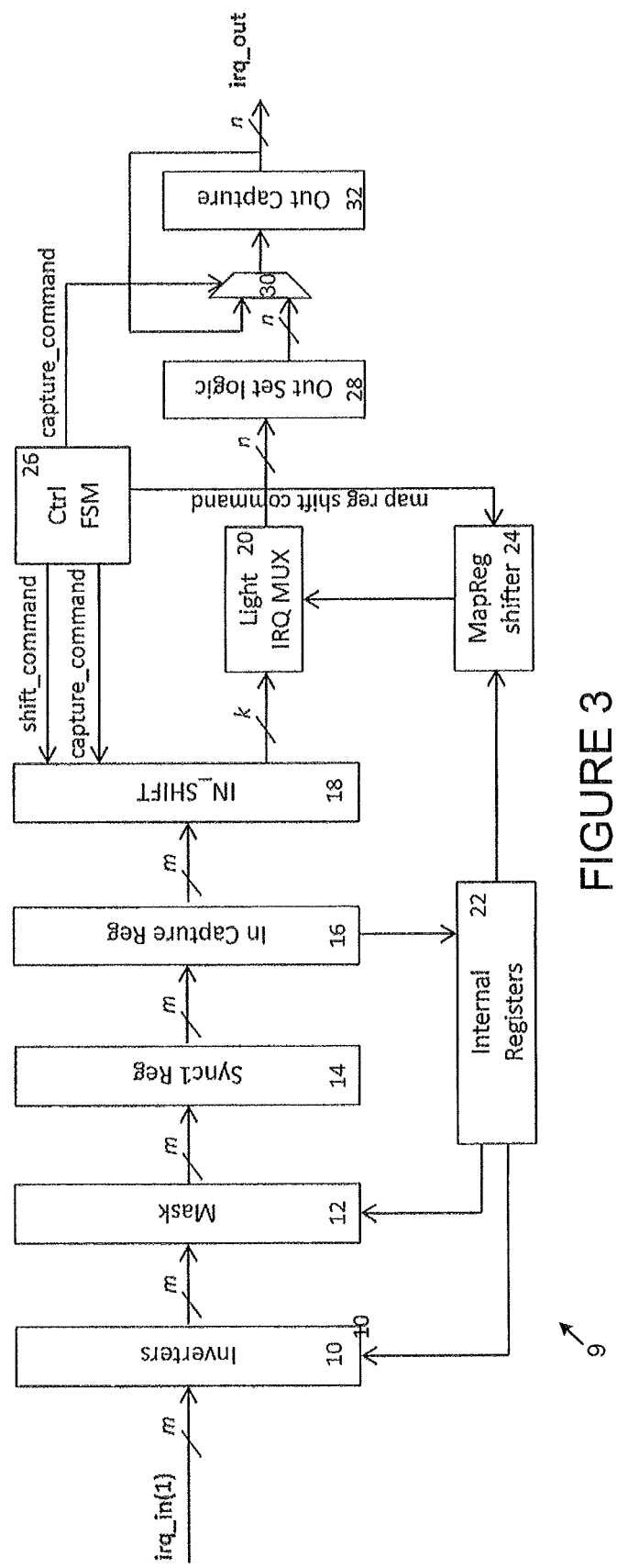
FIG. 3 schematically depicts a request routing circuit according to one embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

FIG. 1 diagrammatically illustrates an environment within which requests may be routed in accordance with various embodiments of the present disclosure. The environment 120 includes a processing unit 100 configured to receive requests from (for example) any of a first peripheral device ("Peripheral A") 102, a second peripheral device ("Peripheral B") 104 and a third peripheral device ("Peripheral C") 106. It should be appreciated that the number of peripheral devices shown is by way of example only, and that more or less than three peripheral devices may be provided. Additionally or alternatively, the requests may be provided by circuitry other than a peripheral device as shown, such as (by way of example only) by a memory or a register. Each peripheral device 102, 104 and 106 or other circuitry may be configured to provide one or more separate interrupt requests.

The processing unit 100 may comprise a single processor or a plurality of processors receiving requests from one or more of peripheral devices 102, 104 and 106 or other circuitry. Each request is provided separately and is presented to a dedicated input of a routing arrangement 108, illustrated in FIG. 1 as including a multiplexer and described in further detail below. The routing arrangement 108 is configured to permit any of the inputs from peripheral devices 102, 104 and 106 or other circuitry to be mapped to any of the outputs. For simplicity and clarity, only a single output for routing arrangement 108 is illustrated in FIG. 1.

The output(s) of the routing arrangement 108 may be provided to a request controller 110, which in turn provides the requests to the processing unit 100. The request controller 110 is configured to manage communication of the requests to the processing unit.

The arrangement of FIG. 1 may be provided on a single integrated circuit, or may be provided across a plurality of integrated circuits. It should be appreciated that one or more of the parts shown in FIG. 3 may be provided off-chip. For example, one or more of the peripheral devices 102, 104 and 106 may be provided off-chip. Those skilled in the art will recognize that the complete structure and operation of an environment within which request routing arrangements may be employed is not depicted in the drawings or described herein. Instead, for simplicity and clarity, only so much of an environment within which a request routing arrangement is employed as is unique to the present disclosure or necessary for an understanding of the present disclosure has been depicted and described.

The routing arrangements of the present disclosure may be employed with any suitable requests. By way of example only, the requests may be interrupt requests, direct memory access (DMA) requests, status requests and/or service requests.

FIG. 2 schematically depicts one example of a routing arrangement circuit 2 that may be utilized to implement routing arrangement 108. The routing arrangement circuit 2 is configured to receive m inputs irq_in[0], irq_in[1], irq_in[2], . . . , irq_in[m−1]. As suggested by the signal names, the inputs irq_in[0], irq_in[1], irq_in[2], . . . , irq_in[m−1] are interrupt requests for the example of FIG. 2. These inputs are provided by one or more of the peripheral devices 102, 104 and 106 and/or other circuitry as discussed above. The routing arrangement circuit 2 is configured to provide n outputs irq_out[0], irq_out[1], . . . , irq_out[n−1]. The routing arrangement circuit 2 is fully configurable, meaning that any input irq_in[0], irq_in[1], irq_in[2], . . . , irq_in[m−1] can be routed to any output irq_out[0], irq_out[1], . . . , irq_out[n−1]. This has the advantage that the routing arrangement can be configured by software.

Each input signal irq_in[x] is supplied to one input of each of a plurality of two input AND gates 3, 5 and 7. In FIG. 2 only three AND gates are depicted for the sake of clarity, although in practice n AND gates are provided for each input signal irq_in[x], for a total of n×m AND gates. The second input to each AND gate 3, 5 and 7 associated with a respective one of the input signals irq_in[x] is provided by a respective address decoder 8. The output 0 of each one of the address decoders 8 is thus provided as the second input to a corresponding one of the first AND gates 3; the output 1 of each one of the address decoders 8 is likewise provided as the second input to a corresponding one of the second AND gates 5; and the output n−1 of each one of the address decoders 8 is provided as the second input to a corresponding one of the nth AND gates 7. Each address decoder 8 is controlled by the output of a respective register REG0, REG1, REG2, . . . , REG(m−1) (not shown in FIG. 2). The particular output 0, 1, . . . , n−1 of each address decoder 8 that is asserted, if any, is thus controlled by those registers.

Each input signal irq_in[x] is thus provided to n AND gates. The first AND gate 3 associated with each input signal irq_in[x] has an output provided to an input of a first of a plurality of OR gates 6. Although only three OR gates 6 are depicted in FIG. 2 for clarity, in practice n OR gates are provided. Each OR gate receives m inputs, one associated with each input signal irq_in[x] and provided by the output of a respective one of the AND gates 3, 5 and 7. Each one of the n OR gates provides one of the respective outputs irq_out[y]. The address decoders 8 thus control to which output irq_out[0], irq_out[1], . . . , irq_out[n−1] a given input irq_in[0], irq_in[1], irq_in[2], . . . , irq_in[m−1] is routed by controlling the logic of AND gates 3, 5 and 7, the outputs of which are routed through OR gates 6.

The routing arrangement circuit 2 of FIG. 2 may be considered to be made up gates, the function of which may be defined as follows:

For each input pin, an "address decoder tree" is created using the destination output number (set in a programmable register) as the address. The Boolean AND operation is then applied to the input value with each of the decoder outputs (of which there will be one per destination).

For each output pin, the Boolean OR operation is applied to all of the decoded values from each input, together.

An OR gate with m inputs can be implemented with m−1 OR2 gates (where "OR2" refers to a two input OR gate and "AND2" refers to a two input AND gate). As previously noted, n AND2 gates are employed. As a result, the total number of gates needed to implement the routing arrangement circuit 2 depicted in FIG. 2 is:

$$AND2: m*n*(\log_2 n - 1) + m*n = m*n*\log_2 n$$

$$OR2: n*(m-1)$$

If $m=500, n=224$ $$AND2: 500*224*\log_2(224) = 874423$$

$$OR2: 224*499 = 111776$$

As evident, the total number of gates is approximately 1,000,000 gates (or 1,000 KGates). As can be seen, therefore, the scalability of the architecture of FIG. 2 is limited and, for large numbers of inputs and outputs, may not be practical on an integrated circuit.

FIG. 3 schematically depicts a request routing circuit according to one embodiment of the present disclosure, which addresses some of the issues discussed above in connection with FIG. 2. In this routing arrangement circuit 9, as with the routing arrangement circuit 2 depicted in FIG. 2, any input can be routed to any output under the control of software programming, which in some circumstances may have the advantage that the routing arrangement may be used in a number of different contexts, only requiring the programming to be different.

In the routing arrangement circuit 9 of FIG. 3, m inputs irq_in[0], irq_in[1], irq_in[2], . . . , irq_in[m−1] are received as inputs to inverters 10. The inverters 10 are provided to manage the low and high level requests. Accordingly, some signals may be selectively inverted. For example, one peripheral device may have an interrupt which is signalled by the interrupt going low. As a result, the inverter 10 receiving that input will invert the signal so that the interrupt is signalled to the processing unit by going from low to high. Accordingly, an input signal can either be input to its respective inverter 10 or bypass the inverter. For each individual signal, the routing of the input through or around the respective inverter 10 will be controlled by the internal registers.

The inverters 10 have m outputs to a mask 12 provided to turn off interrupts from a specific source. The mask 12 has m outputs to a synchronisation register ("Sync1 Reg") 14, which provides m outputs to an input capture register ("In Capture Reg") 16. The synchronisation register 14 and the input capture register 16 are both synchronisation registers, with the input capture register 16 containing the resynchronised captured inputs. Those skilled in the art will recognize that, in some embodiments, one or both of these registers may be omitted.

The input capture register 16 provides m outputs to a shift register ("IN_SHIFT") 18. The shift register 18 is arranged to provide k outputs to a routing subsystem ("Light IRQ MUX") 20, which may be implemented as a k input, n output multiplexer or crossbar. The shift register 18 is configured such that each shift performed by the shift register is k bits wide, meaning that k bits are shifted down in one cycle.

The k bits of the shift register 18 are input to the routing subsystem 20 that provides n outputs. The routing subsystem 20 provides n outputs to an output logic register ("Out Set logic") 28, the n outputs of which are provided as n inputs to a multiplexer 30. The output logic register 28 comprises set logic, starting with the value "0x0" and in normal operation with each bit able to only be set, not cleared, by the corresponding signals from the routing subsystem 20. Accordingly, in a first cycle, a first set of bits of the output logic register 28 are set by the set logic, responsive to the output from the routing subsystem 20. In the next cycle different bits are set, again in dependence on the output of the routing subsystem 20. It should be noted that the bits that are set in the first cycle remain set and different bits of the register are set in the next cycle. This is repeated for each of the cycles required to provide all of the desired n outputs. The output logic register 28 retains the set values and these values are output via the multiplexer 30 to the output capture register ("Out Capture") 32. The output capture register 32 is configured so that the multiplexer 30 provides an output responsive to the issuance of a capture command to cause the output of the output logic register 28 to be output from the multiplexer 30. The output logic register 28 will be reset to the 0x0 state when all the data has been captured.

The multiplexer 30 thus provides n outputs to the output capture register 32. The n outputs of the output capture register 32 provide (drive) the n irq_out output signals. Thus, the content of the output capture register 32 is updated at the end of the shift cycle. It should be noted that the output of the output capture register 32 is fed back into an input of the multiplexer 30, which maintains the values in the output capture register 32 until the next set of cycles is completed.

A finite state machine controller ("Ctrl FSM") 26 provides shift commands and capture commands to the shift register 18, capture commands to the control input of the multiplexer 30, and a map register shift command to a map register shifter ("MapReg shifter") 24. The map register shifter 24 provides a control output to the IRQ routing subsystem 20. The FSM controller 26 is programmable and as such is able to cause the routing subsystem 20 to function in a desired manner.

Internal registers 22 provide outputs to the inverters 10, the mask 12 and the map register shifter 24. The internal registers 22 receive an output from the input capture register 16 and are configured to receive control commands from the processing unit 100 via a bus (not shown). The outputs of the internal registers 22 configure the inverters 10 and the mask 12. The values provided by the internal registers 22 are thus programmable and are able to cause the routing subsystem 20 to function as desired.

An input signal irq_in[x] (irq_in[1] depicted for purposes of explanation only) is transferred by routing arrangement circuit 9 to the mapped output irq_out[y] in zero cycles. In some embodiments, however, a zero cycle latency may not be required. In general, a service routine is estimated to require a predefined period of time to complete, which (by way of example) may be 20 microseconds (µs). An input signal irq_in is transferred to the mapped output irq_out in y cycles, with the time taken for y cycles being less than the predefined period of time. Accordingly, in various disclosed embodiments, instead of using a large routing arrangement in one step, a smaller routing arrangement is used a plurality of times.

Consider the example of an arrangement designed to receive 500 input signals irq_in and produce 200 output signals irq_out: With the routing arrangement circuit 2 of FIG. 2, this would require a 500 by 200 gate routing arrangement with a propagation completed in a single step. As already discussed in relation to FIG. 2, such a routing arrangement may be impractical to implement, for example, in the context of an integrated circuit.

With the routing arrangement circuit 9 of FIG. 3, however, the 500 inputs and 200 outputs could be handled using a 100 by 200 signal routing subsystem, with routing subsystem used five times (taking five cycles). The specific numbers, of course, are by way of example only.

It should be appreciated that the IRQ routing subsystem 20 within the routing arrangement circuit 9 of FIG. 3 may be similar to the IRQ routing arrangement circuit 2 shown in FIG. 2. In practice, the IRQ routing subsystem 20 in the embodiment of FIG. 3 may be simpler in that the multiplexer does not require any inverter/mask control or any other internal register, which would, in practice, be required by the routing arrangement circuit 2 of FIG. 2.

The IRQ routing subsystem 20 in FIG. 3 may be a fully combinatorial k×n cross bar. Thus, the IRQ routing subsystem 20 outputs are captured in the output logic register 28, where each value is registered if the value is a logical "1" and ignored if the value is a logical "0." This provides an equivalent to an OR function needed in a full crossbar scheme, but implemented over time. The output logic register 28 bits are thus updated on every cycle to include the new logical "1" values, in addition to the previous "1" values.

The corresponding gate count for some embodiments (using the formula set out previously), assuming k=16:

$$AND2: 16*224*\log_2(224) = 27981$$

$$OR2: 224*15 = 3360$$

The total gate count is approximately 30,000 gates (30 KGates). Therefore some embodiments may reduce the gate count to be (for example) around 33 times lower in the embodiment of FIG. 3 than in the embodiment of FIG. 2. As can be seen, the routing arrangement circuit 9 of FIG. 3 requires a much smaller integrated circuit area than the routing arrangement circuit 2 of FIG. 2.

As previously discussed, the input capture register 16 needs to be shifted m/k times, meaning that that m/k cycles (rounded up to the next integer) are required. The number of cycles required is the number of times that data is presented to the inputs of the routing subsystem 20 in order to get the full set of n outputs. In the example where m equals 500 and k equals 16, this would require 32 cycles. As noted, where m/k gives a non-integer number, the number of cycles is rounded up to the next integer.

In some embodiments, these cycles need to be completed in less time than that taken by the service routine performed by the processing unit 100. In the example where the service routine takes less than 0.2 microseconds, the frequency needs to be greater than the number of cycles divided by the service routine time. If the number of cycles is 3 and the latency is 0.2 microseconds, the frequency should be equal or greater than 155 mega Hertz (MHz). This would require, for example, a minimum frequency of 200 MHz as the frequency used to control the latency of the routing arrangement.

Embodiments may be provided on one or more integrated circuits or dies for inclusion in a system-in-package.

A service routine performed by processing unit 100 may involve determining which function is making a request and acting in accordance with that request. Generally while the next set of requests is being captured, the previous set of requests is being serviced. Servicing may take any suitable form such as reading a register, servicing an interrupt or any action which will clear the request. The time to capture the next set of requests should be less than the time to service the previous set of requests.

In one embodiment, two or more routing subsystems 20 may operate in parallel, with the two or more routing subsystems 20 being of the same or different size. Such an arrangement may be used where all the inputs may not need to be able to map to any of the outputs. Some embodiments may be programmable to prevent certain inputs from being routed to one or more particular outputs. In other embodiments, one or more inputs may be only routable to one or more particular outputs.

Embodiments of the routing arrangement circuit 9 may be used in any suitable device. By way of example only, the devices may include set top boxes, mobile phones, smart phones, personal data organizers or any other suitable device. Some embodiments may find application where there are large, complicated system-on-chip (SoC) requirements.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

The invention claimed is:

1. A request routing arrangement, comprising:
   m inputs configured to receive m input request signals;
   n outputs configured to output a set of n output request signals;
   a routing subsystem provided between the m inputs and the n outputs and comprising k inputs and n outputs, where m is greater than k, the routing subsystem configured to operate over a plurality of cycles to provide the set of n output request signals to the n outputs, wherein a number of the plurality of cycles is a function of the m input request signals;
   at least one synchronising register between the m inputs and the k inputs, wherein the synchronising register is configured to capture m request signals; and
   a mask configured to receive signals corresponding to the m input request signals.

2. The request routing arrangement of claim 1, wherein m is greater than or equal to n.

3. The request routing arrangement of claim 1, wherein the arrangement is configured to operate over m/k cycles, rounded up a next integer, to provide the set of n output request signals.

4. The request routing arrangement of claim 1, wherein the plurality cycles are completed in a time that is less than a service time for a set of requests.

5. The request routing arrangement of claim 1, further comprising:
   a shift register configured to receive m input request signals and shift out k of the m input request signals to the routing subsystem in one of the cycles.

6. The request routing arrangement of claim 5, further comprising:
   a controller configured to control the shift register.

7. The request routing arrangement of claim 6, wherein the controller comprises a finite state machine.

8. The request routing arrangement of claim 1, further comprising:
   at least one synchronising register between the m inputs and the k inputs, wherein the synchronising register is configured to capture m request signals.

9. The request routing arrangement of claim 8, further comprising:
   inverters configured to selectively receive some of the m input request signals.

10. A request routing arrangement, comprising:
    m inputs configured to receive m input request signals;
    n outputs configured to output a set of n output request signals;
    a routing subsystem provided between the m inputs and the n outputs and comprising k inputs and n outputs, where m is greater than k, the routing subsystem configured to operate over a plurality of cycles to provide the set of n output request signals to the n outputs;
    at least one synchronising register between the m inputs and the k inputs, wherein the synchronising register is configured to capture m request signals;
    inverters configured to selectively receive some of the m input request signals; and
    a mask configured to receive signals corresponding to the m input request signals through or around the inverters.

11. The request routing arrangement of claim 10, further comprising:
    at least one control register configured to control at least one of the inverters, the mask, the at least one synchronisation register and the routing subsystem.

12. The request routing arrangement of claim 11, wherein the at least one control register comprises programmable values for controlling at least one of the inverters, the mask, the at least one synchronisation register and the routing subsystem.

13. The request routing arrangement of claim 1, further comprising:
a register configured to capture outputs from the routing subsystem for each of the plurality of cycles and to provide the set of n output requests after the plurality of cycles.

14. A request routing arrangement, comprising:
m inputs configured to receive m input request signals;
n outputs configured to output a set of n output request signals;
a routing subsystem provided between the m inputs and then outputs and comprising k inputs and n outputs, where m is greater than k, the routing subsystem configured to operate over a plurality of cycles to provide the set of n output request signals to the n outputs; and
a register configured to:
capture outputs from the routing subsystem for each of the plurality of cycles and to provide the set of n output requests after the plurality of cycles, and
logically OR each current set of outputs of the routing subsystem with an accumulation of sets of outputs captured in one or more previous cycles.

15. The request routing arrangement of claim 13, further comprising:
a multiplexer configured to receive the n outputs from the register and output the set of n output request signals to an output register.

16. An integrated circuit comprising the request routing arrangement of claim 1, wherein the integrated circuit includes at least one processor and at least one peripheral.

17. A device comprising the request routing arrangement of claim 1, the device comprising one of a set top box, a mobile set top box, a mobile phone, a smart phone, a personal data organizer, a video device, and an audio device.

18. A method for routing requests, the method comprising:
receiving, by a request routing circuit, m input request signals;
operating the request routing circuit over a plurality of cycles to provide a set of n output request signals, wherein k of the m input request signals are routed during each of the cycles, where m is greater than k;
capturing, by at least one synchronising register between the m inputs and the k inputs, m request signals;
receiving, by a mask, signals corresponding to the m input request signals; and
outputting at the end of the plurality of cycles the set of n output request signals to a processing unit, wherein a number of the plurality of cycles is a function of the m input request signals.

19. The method of claim 18, further comprising:
completing the plurality of cycles in a time which is less than a service time for a set of requests.

20. The method of claim 18, further comprising:
operating during each of m/k cycles, rounded up a next integer, to provide the set of n output request signals.

* * * * *